(12) United States Patent
Gaucel et al.

(10) Patent No.: US 9,109,950 B2
(45) Date of Patent: Aug. 18, 2015

(54) METHOD AND DEVICE FOR CORRECTING SPATIAL RESPONSE FOR IMAGING FOURIER TRANSFORM SPECTROMETERS

(71) Applicant: THALES, Neuilly-sur-Seine (FR)

(72) Inventors: Jean-Michel Gaucel, Cannes-la-Bocca (FR); Claude Israbian, Cannes-la-Bocca (FR); Denis Simeoni, Cannes-la-Bocca (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 14/109,810

(22) Filed: Dec. 17, 2013

(65) Prior Publication Data

US 2014/0177973 A1 Jun. 26, 2014

(30) Foreign Application Priority Data

Dec. 21, 2012 (FR) .................................... 12 03559

(51) Int. Cl.
| | |
|---|---|
| *G06T 5/00* | (2006.01) |
| *G01J 3/28* | (2006.01) |
| *H04N 5/33* | (2006.01) |
| *H04N 5/232* | (2006.01) |
| *H04N 5/347* | (2011.01) |
| *H04N 5/365* | (2011.01) |

(52) U.S. Cl.
CPC .......... *G01J 3/2823* (2013.01); *H04N 5/23245* (2013.01); *H04N 5/33* (2013.01); *H04N 5/347* (2013.01); *H04N 5/365* (2013.01); *H04N 5/3651* (2013.01)

(58) Field of Classification Search
CPC .......... G01J 3/2823; G06T 5/10; H04N 5/33; H04N 5/365; H04N 5/3651
USPC .................. 382/274; 356/300, 327, 451, 346; 375/340, 220
See application file for complete search history.

(56) References Cited

U.S. PATENT DOCUMENTS

| | | | |
|---|---|---|---|
| 5,675,613 A | 10/1997 | Uwano et al. | |
| 5,777,736 A | 7/1998 | Horton | |
| 6,079,665 A * | 6/2000 | Nella et al. | 244/3.17 |
| 6,198,532 B1 * | 3/2001 | Cabib et al. | 356/456 |
| 6,276,798 B1 * | 8/2001 | Gil et al. | 351/206 |
| 6,552,794 B2 * | 4/2003 | Garini | 356/445 |
| 6,687,007 B1 * | 2/2004 | Meigs | 356/456 |
| 7,167,249 B1 * | 1/2007 | Otten, III | 356/456 |
| 7,609,731 B2 * | 10/2009 | Dantus et al. | 372/30 |
| 7,973,936 B2 * | 7/2011 | Dantus | 356/451 |
| 8,018,597 B2 * | 9/2011 | Scott | 356/451 |
| 8,526,002 B2 * | 9/2013 | DeFlores et al. | 356/451 |
| 8,649,008 B2 * | 2/2014 | Kashani et al. | 356/327 |
| 2007/0075888 A1 | 4/2007 | Kelly et al. | |

(Continued)

*Primary Examiner* — Mekonen Bekele
(74) *Attorney, Agent, or Firm* — Baker & Hostetler LLP

(57) ABSTRACT

A method for correcting spatial response for an imaging Fourier transform spectrometer comprises the following steps: a prior step of calculation of the equalization parameters comprising a gain and an offset from data forming calibration scenes; a step of determination of equalization coefficients at a so-called pseudo superpixel level determining the gains and offsets at macropixel level from the data from a raw image that are collected by the imaging spectrometer in image mode, and gains and offsets determined in the prior step; and a step of equalization at pseudo superpixel level, applying the equalization coefficients to a macropixel from an acquisition in the interferogram mode of the imaging spectrometer in order to restore an equalized interferogram.

13 Claims, 3 Drawing Sheets

(56) References Cited

U.S. PATENT DOCUMENTS

| | | | |
|---|---|---|---|
| 2009/0316159 A1* | 12/2009 | Scott | 356/454 |
| 2011/0206291 A1* | 8/2011 | Kashani et al. | 382/255 |
| 2013/0314702 A1* | 11/2013 | DeFlores et al. | 356/300 |
| 2014/0247990 A1* | 9/2014 | Gaucel et al. | 382/180 |

* cited by examiner

METHOD AND DEVICE FOR CORRECTING SPATIAL RESPONSE FOR IMAGING FOURIER TRANSFORM SPECTROMETERS

CROSS-REFERENCE TO RELATED APPLICATION

This application claims priority to foreign French patent application No. FR 1203559, filed on Dec. 21, 2012, the disclosure of which is incorporated by reference in its entirety.

FIELD OF THE INVENTION

The present invention relates to a method and a device for spatial correction, notably for Earth observation devices, and more particularly imaging Fourier transform spectrometers. Such devices can notably be used in weather observation satellites.

BACKGROUND

A Fourier transform spectrometer, commonly denoted by the initials FTS, is an instrument observing a scene with a relatively low spatial resolution—i.e. sampling point size—and a very fine spectral resolution, and is consequently typically coupled with a so-called "imaging" device, working in wideband, which device has a finer spatial resolution. The FTS is coupled with an imager in the aim of improving a spatial alignment or "registration" of the FTS instrument.

By way of example, in a weather observation satellite, the Fourier transform spectrometer makes it possible to observe the spectrum of light in the infrared/near-infrared range, and its spatial resolution can be of the order of 10 to 20 kilometers. The Fourier transform spectrometer is coupled with an imager of finer resolution, of the order of the kilometer, allowing a better physical analysis of the observed scene.

Known Fourier transform spectrometers comprise an analogue detector arranged in a pupil plane. More recent Fourier transform spectrometers—called imaging FTS—comprise, as a replacement for the analogue detector, a focal plane array detector placed in an image plane. Breakdown of the field of a sampling point—representing the final resolution of the instrument—into elementary pixels notably makes it possible to effect digital compensation for the effect of the field, or "auto-apodization", or else to make use of an image mode, i.e. a mode making it possible to image the field of view of a sampling point with a fine spatial resolution. This image mode makes it possible to replace the imager. The physical pixels forming such a matrix are typically produced using technology commonly denoted by the initials CMOS (Complementary Metal Oxide Semiconductor) or CCD (Charge-Coupled Device) technology. In order to optimize the signal-to-noise ratio, the reading of the detector is carried out using spatial resolutions that vary according to the mode. Henceforth, the term "macropixel" denotes the "digital" resolution of the Fourier transform spectrometer, and the term "superpixel" denotes the "digital" resolution of the image mode. A superpixel can be formed by a physical pixel of the detector array, or else by a grouping of physical pixels, for example of 2×2 or 3×3 pixels, according to the spatial resolution required for the image mode. A macropixel defines the spatial resolution of the interferogram mode, and is in practice formed by a plurality of physical pixels of the detector array, for example arranged according to an alignment into one or more rows or into one or more columns of physical pixels of the detector array, into the direction of the interferometric fringes in order to maintain a good level of contrast inside each macropixel.

A drawback of such Fourier transform spectrometers is linked to the fact that they are particularly sensitive to non-uniformities of response in the field of view. Non-uniformities of response are mainly due to the detector—also called PRNU, the initials for Pixel Response Non-Uniformity—and to the optics.

According to a known technique, it is possible to carry out equalization for the interferometric data on average over the interferometric macropixel. This technique is described in detail below with reference to FIG. 1. This technique is particularly suitable for observed scenes of a homogenous nature.

SUMMARY OF THE INVENTION

One aim of the present invention is to palliate at least the aforementioned drawbacks, by proposing a device and a method of spatial correction for a device such as an imaging Fourier transform spectrometer, based advantageously on the mode of operation as an imager at the superpixel resolution of this apparatus.

With this aim, the subject of the present invention is a method for correcting spatial response for an imaging Fourier transform spectrometer having at least one mode of operation called interferometric mode consisting in acquiring interferograms, the interferometric mode having a first spatial resolution corresponding to the dimension of one macropixel, one macropixel being made up of several pixels of an array of a detector placed in an image plane, and a mode of operation called image mode consisting in acquiring images, the image mode having a second spatial resolution corresponding to the dimension of one superpixel, one superpixel being made up of at least one pixel of the array of the detector, the method comprising at least the following steps:

- a prior step of calculation of the equalization parameters for all the superpixels i comprising a gain and an offset from data acquired on calibration scenes,
- a step of determination of equalization coefficients at a so-called pseudo superpixel level determining the gains and offsets at macropixel level from an image acquired in image mode, and gains and offsets determined in the prior step,
- a step of equalization at pseudo superpixel level, applying the equalization coefficients to a macropixel from an acquisition in the interferogram mode of the imaging spectrometer in order to restore an equalized interferogram.

In an embodiment of the invention, the calibration scenes may be spatially uniform.

In an embodiment of the invention, the calibration scenes may be scenes of black body and cold space type, respectively.

In an embodiment of the invention, the equalization coefficients can be determined by means of relationships (4) and (5) explained below.

In an embodiment of the invention, said prior step can be implemented by means arranged on the ground, the steps of determination and equalization being able to be implemented in on-board means.

The subject of the present invention is also a device for correcting spatial response for an imaging Fourier transform spectrometer, configured for the implementation of a method according to any one of the embodiments described below, the correction device comprising at least one on-ground characterization processing module configured for the implementation of said prior step and an on-board processing module configured for the implementation of said steps of determination and equalization.

BRIEF DESCRIPTION OF THE DRAWINGS

Other features and advantages of the invention will appear on reading the description, given by way of purely illustrative and non limiting example, with reference to the appended drawings, in which.

DETAILED DESCRIPTION

Figure 1:
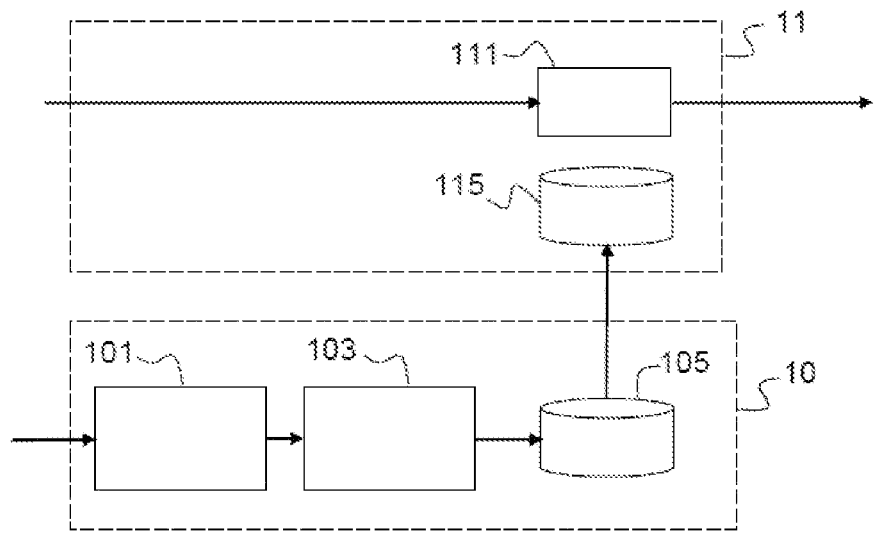
FIG. 1 shows a flow chart synoptically illustrating a known method for correcting spatial response for a Fourier transform spectrometer.

FIG. 1 presents a flow chart synoptically illustrating a known method for correcting spatial response for a Fourier transform spectrometer.

According to a known technique for equalizing a macropixel, illustrated by FIG. 1, equalization coefficients can be stored in an on-board memory as in-flight programmable parameters. According to this technique, even if the on-ground characterization of the equalization coefficients is performed at superpixel level, the applied equalization coefficients are equivalent to a characterization which would be made at macropixel level. This is one drawback of the known technique: the equalization is performed at macropixel level, and does not use the characterization performed at superpixel level, as is the case for the present invention.

Thus, with reference to FIG. 1, an equalization method can comprise a step of calculation of the equalization coefficients at superpixel level 101, i.e. of the gain and of the deviation or "offset", according to the terminology commonly used in the technical field, at superpixel level, and a step of calculation of the equalization coefficients at macropixel level 103, these coefficients being calculated from calibration scenes, for example views called BB and CS, standing for black body and cold space, respectively. The coefficients thus determined can be stored in a memory 105. The two calculation steps 101, 103 previously mentioned may be implemented inside a calculation module 10 arranged on the ground.

The equalization coefficients stored in the memory 105 can be transmitted to an on-board calculation module 11. For example, the data stored in the memory 105 can be downloaded to an on-board memory 115 by appropriate data transfer means. The on-board calculation module 11 can be configured to implement an equalization step 111, applying the equalization coefficients to each interferogram acquired by the Fourier transform spectrometer.

According to the present invention, it is proposed that equalization coefficients relating to the superpixel, notably offset coefficients and gain coefficients, be stored in an on-board memory. Then, on-board calculation means, more precisely an image processing module, can allow the offset and gain coefficients of the macropixel to be calculated almost in real time. Unlike the aforementioned known techniques, the present invention proposes that the equalization coefficients of the macropixel be determined from the raw image, as acquired by the spectrometer in imaging mode.

For each acquisition of a given interferogram, the equalization coefficients are constant for all the samples of this interferogram. Thus, a method according to the present invention has the advantage of not producing spectral artefacts.

A peculiarity of the present invention lies in the fact that the equalization coefficients are determined at superpixel level, the equalization being applied at macropixel level.

Figure 2:
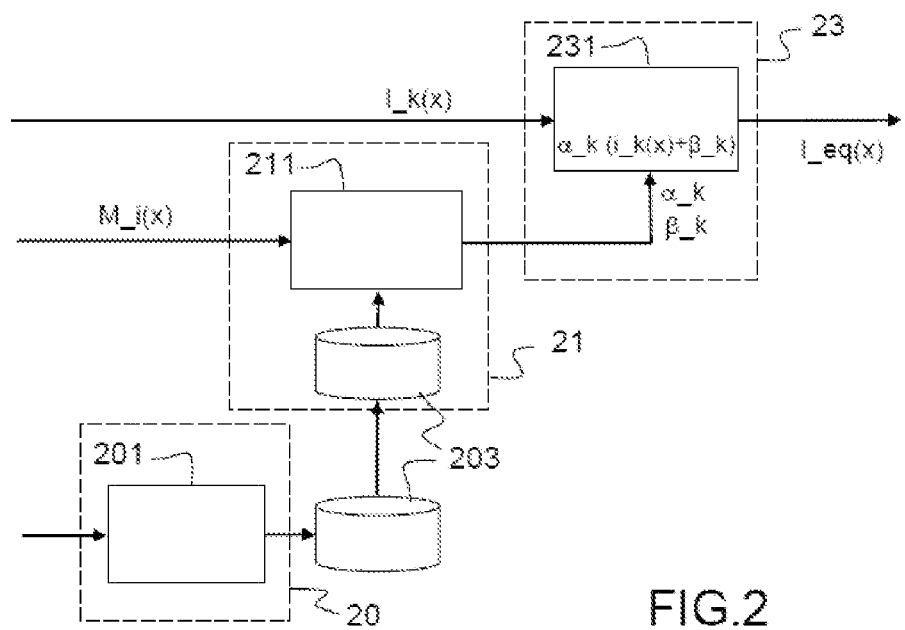
FIG. 2 shows a flow chart illustrating a method for correcting spatial response for a Fourier spectrometer, according to an embodiment of the present invention.

Now with reference to FIG. 2, a correction method according to the present invention can have a prior step of calculation 201 of the equalization parameters of the superpixel, i.e. a calculation of gain and offset coefficients at superpixel level. The prior calculation step 201 can be implemented in an on-ground characterization processing module 20.

The prior calculation step 201 constitutes so-called "off-line" characterization processing, performed by means that are physically arranged on the ground. This characterization processing can be performed periodically according to a specific frequency.

During the prior calculation step 201, the calculation of the equalization parameters is performed from the data forming calibration scenes, for example BB and CS scenes. Henceforth, it is considered that the BB and CS scenes are spatially uniform. It is also considered that the detector array of the Fourier transform spectrometer is totally illuminated, which supposes that the detector constitutes the field diaphragm. If this is not the case, a method according to the present invention can advantageously comprise additional compensation means provided for this purpose. The parameters calculated during the prior calculation step 201 can be stored in a memory 203.

The acquisition of the image can be performed before or after the acquisition of the interferogram. Henceforth, it is considered that an interferogram can be stored in a buffer memory before it is processed.

The data from the calibration scenes BB and CS are used for determining the gains $a_i$ and the offsets $b_i$ of all the superpixels i.

A measurement is based on a linear model hypothesis in the form: $M=aX+b$, where a and b are the gain and offset parameters, respectively, M denoting a digital signal level, and X represents a luminance level.

The BB view allows the collection of a set of image data $\{M_{BB_i}\}$ for all the superpixels i of a given sampling point.

Similarly, the CS view allows the collection of a set of image data $\{M_{CS_i}\}$ for all the superpixels i of a given sampling point.

In the prior calculation step 201, for all the superpixels i, coefficients $\hat{a}_i$ and $\hat{b}_i$ can be estimated according to the following relationships, respectively:

$$\hat{b}_i = M_{CS_i}, \tag{1}$$

$$\hat{a}_i (M_{BB_i} - M_{CS_i}) \times \sum_{Superpixel\ j \in Sampling\ point} 1 \times \frac{1}{\sum_{Superpixel\ j \in Sampling\ point} (M_{BB_i} - M_{CS_i})}. \tag{2}$$

Relationship (2) above features a summation and a normalization on the scale of one sampling point.

The parameters calculated in the prior calculation step 201 and stored in the memory 203 can be transmitted to an on-board processing module 21 configured to implement a step of determination 211 of the equalization coefficients at a so-called "pseudo superpixel" level. The on-board processing module 21 being situated on board the satellite, the data stored in the memory 203 can be downloaded to an on-board memory 213 by appropriate data transfer means.

The determination step 211 makes it possible to determine the gains and offsets at macropixel level from the data from a raw image that are collected by the imaging spectrometer in image mode, said data being acquired on the same scene as the interferometric mode of the imaging spectrometer, and gains and offsets at superpixel level that are determined by the prior calculation step 201.

From an operational point of view, the calculations performed during the determination step 211 can be formulated in the following manner.

Let a set of image data $\{M_i\}$ be for all the superpixels i belonging to one macropixel.

Let also a set of interferometric data $\{I_k\}$ be for all the macropixels k belonging to one sampling point.

The desired gain for the macropixel is then the equation solution expressed by the following relationship:

$$\hat{\alpha}_k \times \sum_{Superpixel i \in MacroPixel k} (M_i - \hat{b}_i) = \sum X_i, \quad (3)$$

thus:

$$\hat{\alpha}_k = \frac{\sum_{Superpixel i \in MacroPixel k} \left( \frac{M_i - \hat{b}_i}{\hat{a}_i} \right)}{\sum_{Superpixel i \in MacroPixel k} (M_i - \hat{b}_i)}. \quad (4)$$

The practical conditions for evaluating the numerator and denominator terms in relationship (4) above are explained below with reference to FIG. 3.

The desired offset for the macropixel can be formulated according to the following relationship:

$$\hat{\beta}_k = \sum_{Superpixel i \in MacroPixel k} \hat{b}_i. \quad (5)$$

The gain and offset parameters thus determined at the determination step 211 can then be transmitted to an on-board interferogram processing module 23, allowing the performance of an equalization step 231 at pseudo superpixel level. The equalization step 231 applies the equalization parameters to a macropixel k from an acquisition $I_k$ in the interferogram mode of the imaging spectrometer in order to restore an equalized interferogram $I_{eq\_k}$, in a manner formulated by the following relationships:

For each sample of parameter x, denoting the optical path difference:

$$I_{eq\_k}(x) = \hat{\alpha}_k \times (I_k(x) + \hat{\beta}_k) \quad (6).$$

Relationship (4) above can be reformulated in the following way:

$$\hat{\alpha}_k = \frac{\sum_{Superpixel i \in MacroPixel k} (\hat{\alpha}_i \times M_i) + \hat{D}_k}{\sum_{Superpixel i \in MacroPixel k} (M_i) + \hat{\beta}_k}, \quad (7)$$

the term $\hat{D}_k$ denoting the deviation for the macropixel k, and being formulated according to the following relationship:

$$\hat{D}_k = \sum_{Superpixel i \in MacroPixel k} \frac{\hat{b}_i}{\hat{a}_i}. \quad (8)$$

Thus, for any pixel i, the equalization gain for the superpixel is written:

$$\hat{\alpha}_i = \frac{1}{\hat{a}_i}. \quad (9)$$

For each macropixel k, the offset and the deviation can thus be written:

$$\hat{\beta}_k = \sum_{Superpixel i \in MacroPixel k} \hat{b}_i, \quad (5)$$

$$\hat{D}_k = \sum_{Superpixel i \in MacroPixel k} \frac{\hat{b}_i}{\hat{a}_i}. \quad (8)$$

The coefficients $\hat{a}_i$ and $\hat{b}_i$ are calculated in the prior calculation step 201 from relationships (1) and (2) above.

These coefficients can be pre-calculated in the aim of reducing the workload of the on-board calculation module.

Thus, the present invention makes it possible to use the data from the imaging mode of an imaging Fourier transform spectrometer in the aim of correcting the non-uniformities at superpixel level.

The equalization method allows "intra-sample" equalization with the aim of:
equalizing the variations in response from the detector or PRNU and the brightness variations in order to improve the uniformity of the response of the instrument point spread function, commonly denoted by the initials IPSF,
removing the baseline in order to remove the contrast or "aliasing" effect, generated by the decimation of the zero frequency. This advantage is provided by the fact that the offset has an impact at the zero frequencies, outside the useful band.

To the extent that the equalization is intended, notably, to correct a non-uniformity effect specific to the detector, it must preferably be performed after a possible correction of non-linearity in the detector. Another advantage of the present invention is that the image mode of the imaging spectrometer can be used permanently so as to authorize a real-time correction.

Figure 3:
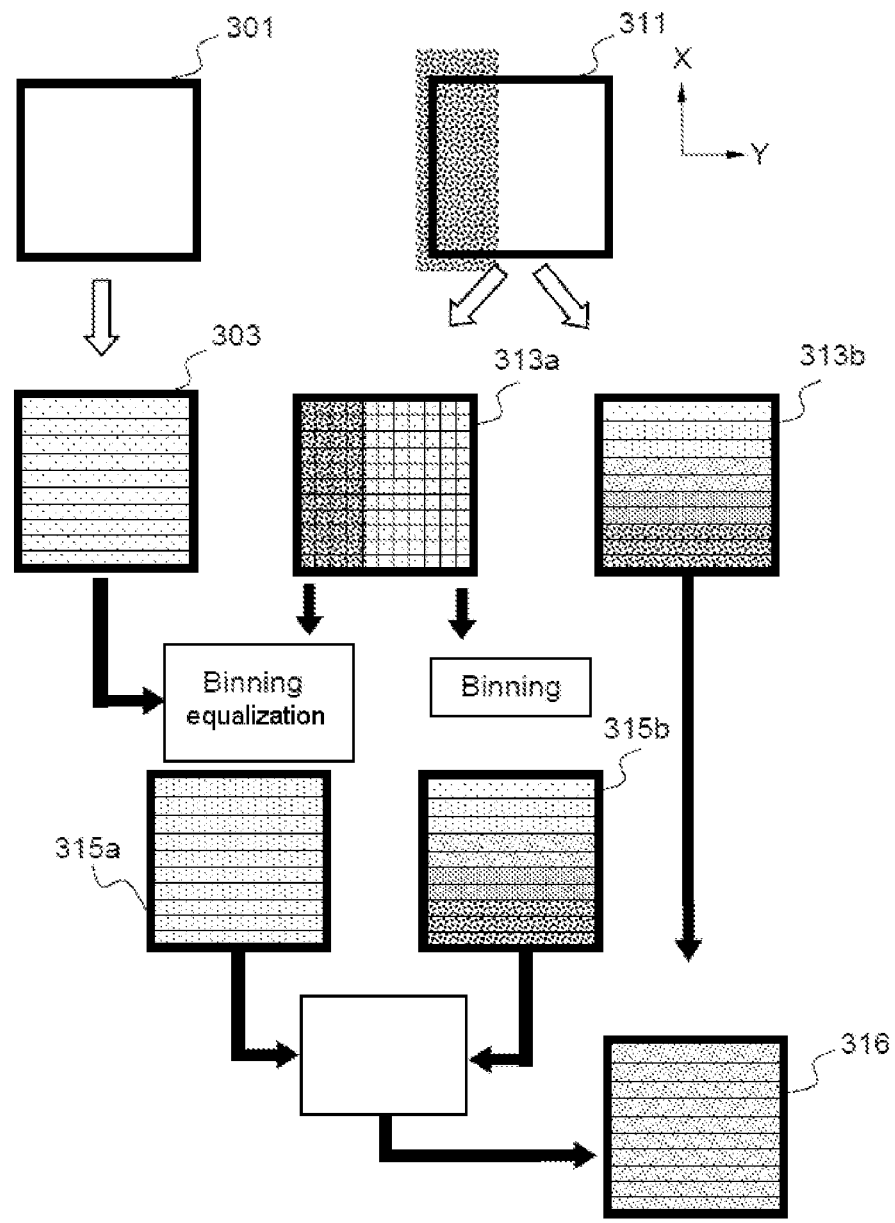
FIG. 3 shows a block diagram synoptically illustrating a method for correcting spatial response according to an embodiment of the invention.

FIG. 3 presents a block diagram synoptically illustrating a method for correcting spatial response according to an examplary embodiment of the invention, the offset not being considered in this case for the sake of clarity of description.

At least two supposedly uniform calibration scenes 301, a view of CS type and a view of BB type, make it possible to establish a map 303 of the detector, comprising the gain and offset data $\hat{a}_i$ and $\hat{b}_i$ for all the superpixels i of the detector, as described previously with reference to FIG. 2, and more precisely at the prior calculation step 201 with reference to FIG. 2.

An observed scene defines a scene view 311, for example in two definitions and defined in a Cartesian frame of reference according to coordinates (x, y). The scene gives rise to the acquisition of a view in image mode 313a, denoted $M_i$ in the preceding relationships (3), (4) and (7), by the imaging mode of the imaging Fourier transform spectrometer, and of a collection of views in interferometric mode 313b, denoted $I_k(x)$ in the preceding relationship (6). In the non-limiting example of the invention illustrated by FIG. 3, the macropixels are formed by pixels grouped by rows, in the alignment of the interferometric fringes, not shown in the figure. They could, in other examplary embodiments, be formed by pixels grouped by columns.

The denominator in relationship (4) above, illustrated by reference 315a in the figure, in which each row corresponds to one macropixel k, is evaluated by grouping of pixels, or "binning", performed on the view in image mode 313a, after equalization by means of the offset equalization parameters contained in the map 303 of the detector.

The numerator in relationship (4) above, illustrated by reference 315b in the figure, in which each row corresponds to one macropixel k, is evaluated by binning of the view in image mode 313a, advantageously after it has been equalized by means of the gain and offset parameters included in the map 303. Term-by-term division of the numerator and denominator terms in relationship (4) makes it possible to obtain the equalization gain coefficients $\hat{\alpha}_k$ for the macropixel. The application of the gain and offset coefficients of the macropixel $\hat{\alpha}_k, \hat{\beta}_k$ according to relationship (7) formulated previously leads to an equalized image according to the method of the invention, said image being illustrated by reference 316 in the figure.

Figure 4:
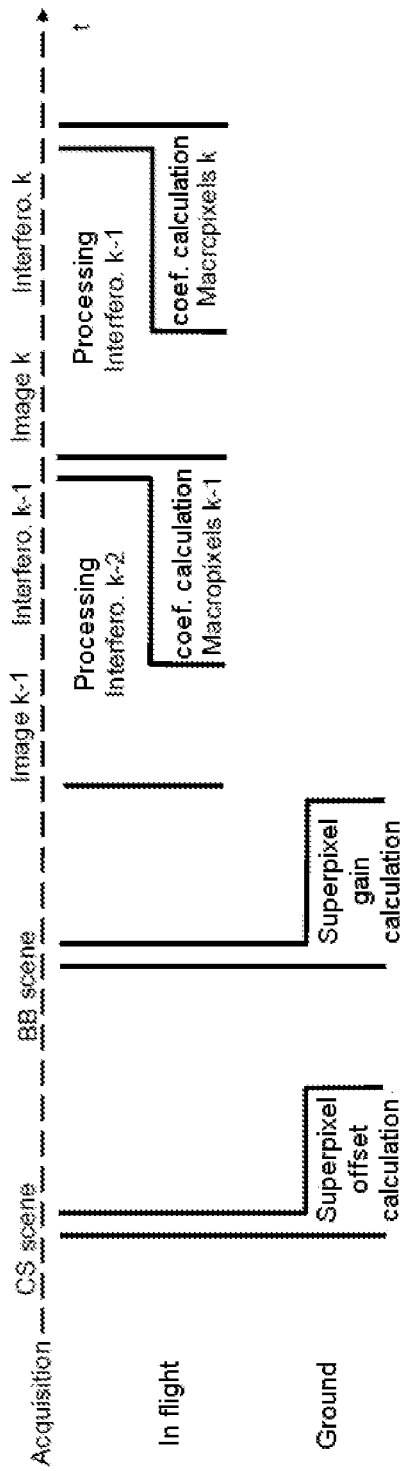
FIG. 4 shows a timing diagram illustrating the operation of a correction method or device according to an embodiment of the invention.

FIG. 4 presents a timing diagram illustrating the operation of a correction method or device according to an examplary embodiment of the invention. First of all, on the ground, in preparation for operational functioning, or "commissioning", the offsets and gains at superpixel level are estimated very precisely. Next, during the operational functioning of the instrument, in flight, before the processing of each interferogram arising from a sighting k, the equalization coefficients at superpixel level are estimated using the images arising from the image mode of the same sighting k.

Judicious sequencing, illustrated by FIG. 4, can consist in processing of the data arising from a sighting k−1, during the acquisition of the sighting k. Thus, during the sighting k, the on-board calculator has access to all the entries for the processing of the sighting k−1, making it possible to avoid synchronization problems between the acquisition and the on-board calculation system.

The invention claimed is:

1. A method for correcting spatial response for an imaging Fourier transform spectrometer having at least one mode of operation called interferometric mode consisting in acquiring interferograms, the interferometric mode having a first spatial resolution corresponding to the dimension of one macropixel, one macropixel being made up of several pixels of an array of a detector placed in an image plane, and a mode of operation called image mode consisting in acquiring images, the image mode having a second spatial resolution corresponding to the dimension of one superpixel, one superpixel being made up of at least one pixel of the array of the detector, said method comprising at least the following steps:

a prior step of calculation of equalization parameters $(\hat{a}_i, \hat{b}_i)$ with a first processing module, for all the superpixels i comprising a gain and an offset, from data acquired on calibration scenes, a step of determination of equalization coefficients at a so-called pseudo superpixel level determining the gains and offsets at macropixel level $(\hat{\alpha}_k, \hat{\beta}_k)$ with a second processing module, from an image acquired in image mode, and gains and offsets determined in the prior step, a step of equalization at pseudo superpixel level, applying the equalization coefficients $(\hat{\alpha}_k, \hat{\beta}_k)$ to a macropixel (k) from an acquisition $(I_k)$ in the interferogram mode of the imaging spectrometer in order to restore an equalized interferogram $(I_{eq\_k})$ with a third processing module.

2. The method of correction of claim 1, wherein the calibration scenes are spatially uniform.

3. The method of correction of claim 1, wherein the calibration scenes are scenes of black body and cold space type, respectively.

4. The method of correction of claim 1, wherein the equalization coefficients $(\hat{\alpha}_k, \hat{\beta}_k)$ are determined by the following relationships:

$$\hat{\alpha}_k = \frac{\sum_{Superpixel\, i \in MacroPixel\, k} \left(\frac{M_i - \hat{b}_i}{\hat{a}_i}\right)}{\sum_{Superpixel\, i \in MacroPixel\, k} (M_i - \hat{b}_i)},$$

$$\hat{\beta}_k = \sum_{Superpixel\, i \in MacroPixel\, k} \hat{b}_i,$$

in which $M_i$ denotes a signal level associated with the superpixel i and where $$\sum_{Superpixel\, i \in MacroPixel\, k} (M_i - \hat{b}_i)$$

is not equal to zero.

5. The method of correction of claim 1, wherein said prior step is implemented by means arranged on the ground, the steps of determination and equalization being implemented in on-board means.

6. A device for correcting spatial response for an imaging Fourier transform spectrometer, said device being configured for the implementation of a method according to claim 1, the correction device comprising at least one on-ground characterization processing module configured for the implementation of said prior step and an on-board processing module configured for the implementation of said steps of determination and equalization.

7. The method of correction of claim 1, wherein the first processing module comprises an on-ground characterization processing module.

8. The method of correction of claim 1, wherein the second processing module comprises an on-board processing module.

9. The method of correction of claim 1, wherein the third processing module comprises an on-board interferogram processing module.

10. The method of correction of claim 1, wherein the second processing module comprises a processing module on-board a satellite.

11. The method of correction of claim 1, wherein the third processing module comprises an interferogram processing module on-board a satellite.

12. The method of correction of claim 1, wherein the first processing module comprises an on-ground characterization processing module, wherein the second processing module comprises an on-board processing module, and wherein the third processing module comprises an on-board interferogram processing module.

13. The method of correction of claim 1, wherein the first processing module comprises an on-ground characterization processing module, wherein the second processing module comprises a processing module on-board a satellite, and wherein the third processing module comprises an interferogram processing module on-board a satellite.

* * * * *